United States Patent
Mizrahi (10) Patent No.: US 9,325,586 B1
(45) Date of Patent: Apr. 26, 2016

(54) PACKET DUPLICATION MEASUREMENT IN A NETWORK DEVICE

(71) Applicant: Marvell Israel (M.I.S.L) Ltd., Yokneam (IL)

(72) Inventor: Tal Mizrahi, Haifa (IL)

(73) Assignee: MARVELL ISRAEL (M.I.S.L.) LTD., Yokneam (IL)

( * ) Notice: Subject to any disclaimer, the term of this patent is extended or adjusted under 35 U.S.C. 154(b) by 0 days.

(21) Appl. No.: 14/670,191

(22) Filed: Mar. 26, 2015

Related U.S. Application Data (60) Provisional application No. 61/970,692, filed on Mar. 26, 2014.

(51) Int. Cl.
*H04L 1/00* (2006.01)
*H04L 12/26* (2006.01)
*H04L 12/931* (2013.01)

(52) U.S. Cl.
CPC ............ *H04L 43/02* (2013.01); *H04L 43/0876* (2013.01); *H04L 49/50* (2013.01)

(58) Field of Classification Search
CPC ...... H04L 43/02; H04L 49/50; H04L 43/0876
See application file for complete search history.

(56) References Cited

U.S. PATENT DOCUMENTS

| | | | | |
|---|---|---|---|---|
| 5,931,916 A * | 8/1999 | Barker | ................ | H04L 12/5692 709/238 |
| 6,978,384 B1 * | 12/2005 | Milliken | .................. | H04L 47/10 709/227 |
| 7,318,102 B1 * | 1/2008 | Krause | .................. | H04L 1/1635 709/227 |
| 8,830,841 B1 | 9/2014 | Mizrahi et al. | | |
| 2004/0062248 A1 * | 4/2004 | Nagarajan | ................ | H04L 45/00 370/394 |
| 2007/0070916 A1 * | 3/2007 | Lehane | ................... | H04L 43/18 370/252 |
| 2007/0097875 A1 * | 5/2007 | Bender | ................. | H04L 1/0057 370/252 |
| 2007/0153782 A1 * | 7/2007 | Fletcher | ............... | H04J 3/1617 370/389 |
| 2013/0272311 A1 * | 10/2013 | Lu | ......................... | H04L 47/624 370/394 |

OTHER PUBLICATIONS

ITU-T Y.1564 Series Y: Global Information Infrastructure, Internet Protocol Aspects and Next-Generation Networks Internet protocol aspects—Quality of service and network performance, "Ethernet service activation test methodology," *International Telecommunication Union*, pp. 1-38 (Mar. 2011).

ITU-T Y.1731 Series Y: Global Information Infrastructure, Internet Protocol Aspects and Next-Generation Networks Internet protocol aspects—Operation, administration and maintenance, *International Telecommunication Union*, pp. 1-82 (Feb. 2008).

(Continued)

*Primary Examiner* — Clemence Han (57) ABSTRACT

A packet received by a network device is associated with a sequence number indicative of an order of transmission of the packet within a sequence of packets received by the network device. The network device determines whether the sequence number associated with the packet meets a first condition or a second condition for determining whether the packet is a duplicate of at least one other packet previously received by the network device. In response to determining that the sequence number meets the first condition, the network device deterministically determines whether the packet is a duplicate based on a record of previously received sequence numbers stored in a memory of the network device. In response to determining that the sequence number meets the second condition, the network device probabilistically determines whether the packet is a duplicate based on historical data maintained by the network device.

20 Claims, 5 Drawing Sheets

(56) References Cited

OTHER PUBLICATIONS

Hedayat et al., "A Two-Way Active Measurement Protocol (TWAMP)," Network Working Group, IETF RFC 5357, pp. 1-26 (Oct. 2008).

Bradner et al. "Benchmarking Methodology for Network Interconnect Devices," Network Working Group, IETF RFC 2544, pp. 1-29 (Mar. 1999).

Morton et al. "Packet Reordering Metrics," Network Working Group IETF RFC 4737 pp. 1-45 (Nov. 2006).

\* cited by examiner

PACKET DUPLICATION MEASUREMENT IN A NETWORK DEVICE

CROSS-REFERENCE TO RELATED APPLICATION

This disclosure claims the benefit of U.S. Provisional Patent Application No. 61/970,692, filed Mar. 26, 2014, entitled "Method for Approximating Packet Duplication Counters," the disclosure of which is hereby expressly incorporated herein by reference in its entirety.

FIELD OF THE DISCLOSURE

The present disclosure relates generally to communication networks and, more particularly, to network devices such as switches, routers, and edge devices.

BACKGROUND

To monitor connectivity, detect link failures, and monitor various performance parameters of computer networks, network devices such as network switches, routers, edge devices and the like often receive sequences of test packets, and perform network performance measurements based on the received sequence of test packets. For example, a network device often determines a rate duplication of packets in a network based on sequence of test packets that the network device receives via the network.

To accurately determine a rate of duplication of packets, the network device is typically stores a large record of sequence numbers associated with the test packet received by the network device. The network device can then determine whether a particular packet is a duplicate packet received by the network device by comparing a sequence number associated with the packet against the large record of sequence numbers previously received by the network device. Storing a large record of sequence numbers received by the network device, however, is costly in terms of memory required to store and maintain the record.

SUMMARY

In an embodiment, a method includes receiving a packet at a network device, the packet associated with a sequence number indicative of an order of transmission of the packet within a sequence of packets received by the network device. The method also includes determining whether the sequence number associated with the packet meets a first condition or a second condition for determining whether the packet is a duplicate of at least one other packet previously received by the network device. The method additionally includes in response to determining that the sequence number meets the first condition, deterministically determining whether the packet is a duplicate of at least one other packet based on a record of previously received sequence numbers, the record stored in a memory of the network device, and in response to determining that the sequence number meets the second condition, probabilistically determining whether the packet is a duplicate of at least one other packet based on historical data maintained by the network device.

In another embodiment, a network device comprises an ingress interface configured to receive packets from a network, wherein the packets are associated with respective sequence numbers indicative of an order of transmission of the packets to the network device. The network device also comprises a memory configured to store a record of sequence numbers that have been received by the network device. The network device further comprises a packet processor configured to determine whether the sequence number associated with the packet meets a first condition or a second condition for determining whether the packet is a duplicate of at least one other packet previously received by the network device. The packet processor is additionally configured to in response to determining that the sequence number meets the first condition, deterministically determine whether the packet is a duplicate of at least one other packet based on information stored in the memory of the network device, and in response to determining that the sequence number meets the second condition, probabilistically determine whether the packet is a duplicate of at least one other packet based on historical data maintained by the network device.

DETAILED DESCRIPTION

In embodiments described below, a network device (e.g., a bridge, router, network switch, a computer, a test equipment device, or any other suitable network device) is configured to efficiently and accurately maintain a count of duplicate packets, in a sequence of packets, received by the network device. In an embodiment, the packets, in the sequence of packets, are associated with respective sequence numbers indicative of the order of transmission of the packets to the network device. The network device maintains a record of received sequence numbers for a range of sequence numbers within the sequence of packets being received by the network device. In an embodiment, the range of sequence numbers for which the record is maintained by the network device corresponds to a subset of all sequence numbers within the sequence of packets received by the network device. The network device is configured to selectively determine whether a received packet is a duplicate of at least one other packet previously received by the network device ("duplicate packet") by selectively (i) deterministically determining whether the packet is a duplicate packet based on a record of previously received sequence numbers maintained by the network device or (ii) probabilistically determining whether the packet is a duplicate packet based on historical data maintained by the network device.

For example, in an embodiment, the network device deterministically determines whether a packet is a duplicate packet based on the record of previously received sequence numbers maintained by the network device when the sequence number associated with the packet is within the range of sequence numbers for which the record is being maintained by the network device, and probabilistically determines whether the packet is a duplicate packet based on historical data when the sequence number associated with the packet is outside of (e.g., precedes) the range of sequence numbers for which the record is being maintained by the network device. Selective deterministic or probabilistic determination of whether packets received by the network device are duplicate packets allows the network device to maintain a relatively small record of sequence numbers previously received by the network device, which requires a relatively small memory space in the network device, while still obtaining an accurate measure of the rate of duplication of packets received by the network device, in an embodiment.

Figure 1:
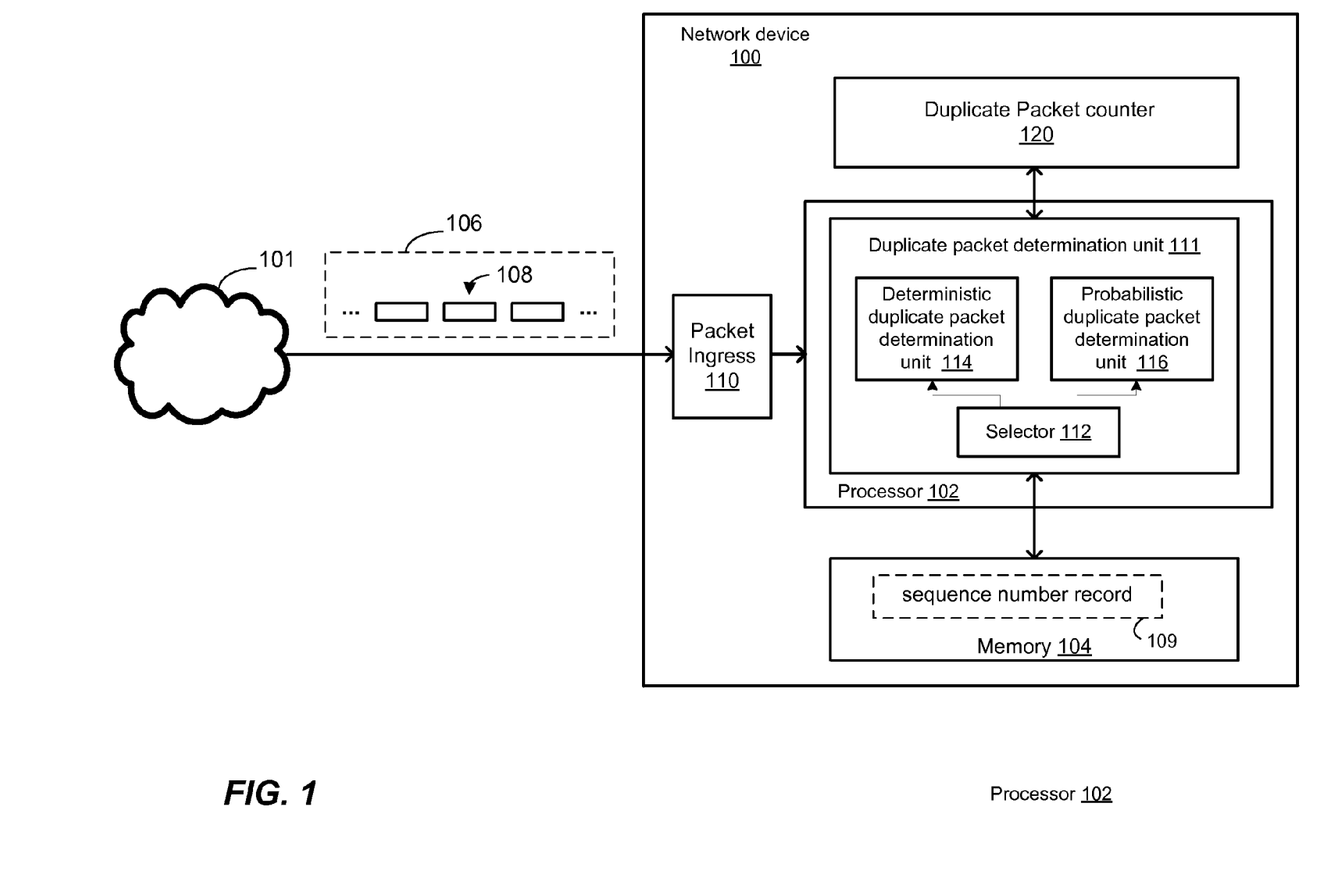
FIG. 1 is a simplified block diagram of an example network device configured to implement efficient duplicate packet measurement techniques of the present disclosure, according to an embodiment.

FIG. 1 is a block diagram of an example network device 100 configured to efficiently account for duplicate packets received by the network device 100, according to an embodiment. The network device 100 includes a processor 102 coupled to a memory 104. The network device 100 also includes an ingress interface 110 coupled to the processor 102 and to a network 101. The ingress interface 110 is configured to receive a sequence 106 of packets 108 transmitted to the network device via the network 101, in an embodiment. In an embodiment, each packet 108 within the sequence 106 is associated with a sequence number indicative of an order of transmission of the packet 108 within the sequence 106 to the network device 100. For example, each packet 108 includes a sequence number indicative of an order of transmission of the packet 108 within the sequence 106 in a header of the packet 108.

In an embodiment, the sequence 106 of packets 108 is transmitted to the network device 100 by another device (not shown) within the network 101 or coupled to the network 101. In another embodiment, the network device 100 transmits the sequence 106 of packets 108, and the packets 108 are reflected back to the network device 100 by a reflector device (not shown) within the network 101 or coupled to the network 101.

In an embodiment, the packets 108 received by the packet egress 110 are provided to the processor 102. The processor 102 is configured to maintain, in the memory 104, a received sequence number record 109 indicative of whether particular sequence numbers, within a range of sequence numbers, have been received by the network device 100 during reception of the sequence 106 by the network device 100. In an embodiment, the range of sequence numbers for which the record is maintained in the received sequence number record 109 corresponds to a subset of all sequence numbers in the sequence 106. For example, according to an embodiment, the rage of sequence numbers for which the record is maintained in the received sequence number record 109 at any given time includes a certain number of sequence numbers that immediately precede a next expected sequence number, within the sequence 106, that is expected to be received by the network device 100.

In some situations, the order in which at least some of the packets 108 are received by the network device 100 does not correspond to the order in which the packets 108 were transmitted to the network device 100. For example, at least some of the packets 108 are reordered in the network 101 such that the packets 108 are received by the network device 100 in an order that is different from the order of transmission of the packets 108 to the network device 100, and/or are duplicated in the network 101 such that multiple copies of a same packet 108 transmitted to the network device 100 are received by the network device 100. In such situations, such packets 108 received by the network device 100 are associated with sequence numbers that are lower than the sequence numbers that are currently expected to be received by the network device 100, in an embodiment. A packet that is associated with a sequence number that is lower than the sequence number that is currently expected to be received by a network device is sometimes referred to herein as an "out-of-order" packet received by the network device. Further, a packet that is determined to be a duplicate of at least one other packet, within a sequence of packets received by a network device, that has previously been received by a network device is sometimes referred to herein as a "duplicate packet" receive by the network device.

In an embodiment, when processor 102 receives a packet 108 associated with a sequence number that is lower than the next sequence number expected to be received by the network device 100, the processor 102 determines that the packet 108 is an out-of-order packet received by the network device 100. The processor 102 further determines whether the out-of order packet 108 is a duplicate packet received by the network device 100, in an embodiment. In an embodiment, in response to determining that the out of order packet 108 is a duplicate packet received by the network device 100, the processor 102 increments a duplicate counter 120 to account for the duplicate packet 108 received by the network device 100.

In an embodiment, the processor 102 includes a duplicate packet determination unit 111 which, in turn, includes a selector 112 coupled to a deterministic duplicate packet determination unit 114 and to a probabilistic duplicate packet determination unit 116. The deterministic duplicate packet determination unit 114 is configured to deterministically determine whether an out-of-order packet 108 is a duplicate packet based on the received sequence number record 109 in the memory 104, in an embodiment. The probabilistic duplicate packet determination unit 116, on the other hand, is configured to probabilistically determine whether an out-of-order packet 108 is a duplicate packet based historical data maintained by the network device 100, in an embodiment. In an embodiment, when the processor 102 receives an out-of-order packet 108, the selector unit 112 selects the deterministic packet determination unit 114 or the probabilistic duplicate packet determination unit 116 for determining whether the packet 108 is a duplicate packet received by the network device 100. In an embodiment, the selector 112 makes this selection based on the sequence number associated with the out-of-order packet 108. For example, in an embodiment, the selector 112 selects the deterministic duplicate packet determination unit 114 when the sequence number associated with the out-of-order packet 108 is within the range of sequence numbers for which the received sequence number record 109 is currently maintained in the memory 104. On the other hand, the selector 112 selects the probabilistic duplicate packet determination unit 114 when the sequence number associated with the out-of-order packet 108 precedes the range of sequence numbers for which the received sequence number record 109 is currently maintained in the sequence number record 109, in an embodiment.

Figure 2:
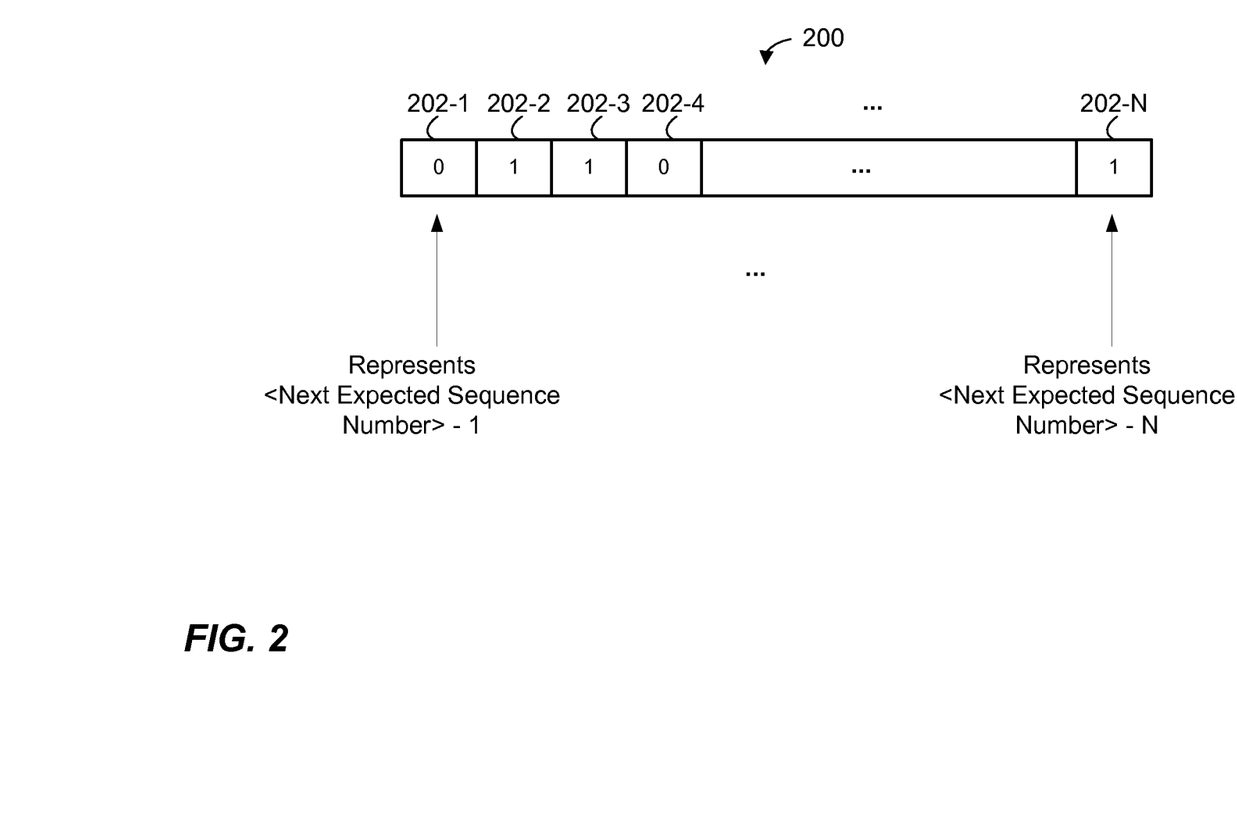
FIG. 2 is a block diagram of a received sequence number record maintained by the network device of FIG. 1, according to an embodiment.

FIG. 2 is a block diagram of a received sequence number record 200, according to an embodiment. In an embodiment, received sequence number record 200 is maintained by the network device 100 of FIG. 1. For example, the received sequence number record 200 corresponds to the received sequence number record 109 of FIG. 1, in an embodiment. In another embodiment, the received sequence number record 200 is used with a network device different than the network device 100 of FIG. 1. Similarly, the network device 100 of FIG. 1 maintains a received sequence number record different than the received sequence number record 200, in an embodiment.

According to an embodiment, the received sequence number record 200 includes a set of indicators 202. A particular indicator 202 corresponds to a particular sequence number and is set to indicate whether at least one packet associated with the particular sequence number has been received by the network device, in an embodiment. In an embodiment, the set of indicators 202 includes indicators corresponding to sequence numbers within a sliding window of consecutive sequence numbers that immediately precede a next expected sequence number expected to be received by the network device. For example, in the illustrated embodiment, the record 200 includes N indicators 202 respectively corresponding to each of N consecutive sequence numbers that immediately precede a next expected sequence number to be received by the network device. Thus, in the illustrated embodiment, the indicator 202-1 corresponds to the sequence number that immediately precedes the next expected sequence number to be received by the network device, the indicator 202-2 corresponds to the sequence number that immediately precedes the sequence number corresponding to the indicator 202-1, and so on, with the last indicator 202-N corresponding to the sequence number that precedes the next expected sequence number by the integer N.

In an embodiment, each indicator 202 comprises one bit set to indicate whether the corresponding sequence number has been received by the network device. For example, a one-bit indicator 202 is set to a value of logic one to indicate that the corresponding sequence number has been previously received by the network device 100, and is set to a value of logic zero indicate that the corresponding sequence number has not yet been received by the network device, or vice-versa, in an embodiment. Thus, for example, in the illustrated embodiment, the indicators 202-1 and 202-4 indicate that corresponding sequence numbers (next expected sequence number -1) and (next expected sequence number -4) have not been received by the network device 100, while the indicators 202-1, 202-4 and 202-N indicate that the corresponding sequence numbers (next expected sequence number -2), (next expected sequence number -3), and (next expected sequence number -4) have been previously received by the network device. As will be explained in more detail below, the network device 100 maintains the received sequence number record 200 by appropriately setting indicators 202 based on sequence numbers associated with packets received by the network device 100, and by appropriately shifting the sliding window of sequence numbers for which the record is being maintained by the network device 100 as packets associated with increasing sequence numbers are received by the network device 100, in an embodiment.

Figure 3:
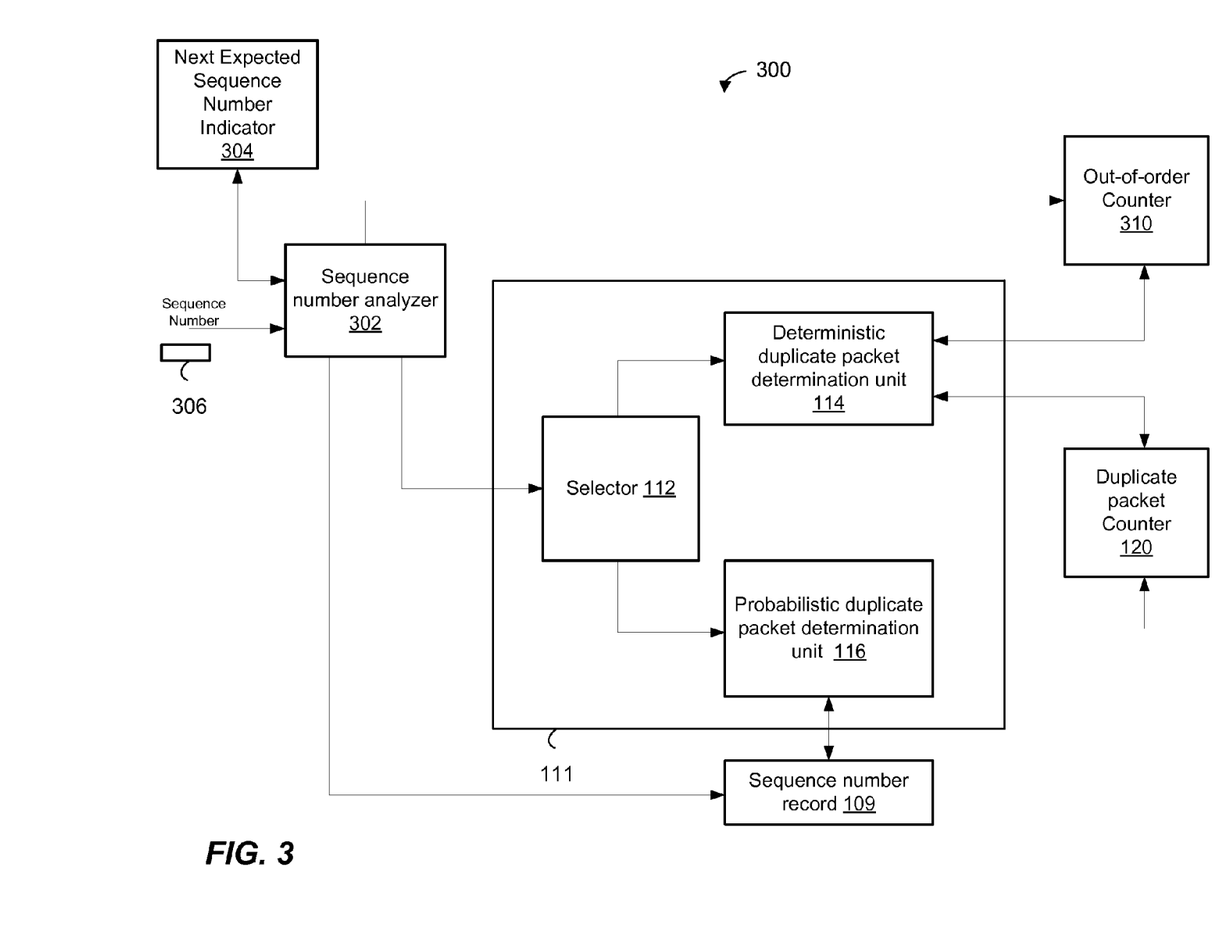
FIG. 3 is a block diagram of a system for determining whether a packet is a duplicate of at least one other packet previously received by the network device of FIG. 1, according to an embodiment.

FIG. 3 is a block diagram of a system for maintaining a count of duplicate packets, in a sequence of duplicate packets, received by a network device, according to an embodiment. In an embodiment, the system 300 is included in the network device 100 of FIG. 1. For ease of explanation, the system 300 is described in connection with the network device 100 of FIG. 1, and includes several like-numbered elements with the network device 100 of FIG. 1. However, the system 300 is used with a network device different from the network device 100 of FIG. 1, in some embodiments. Similarly, the network device 100 of FIG. 1 utilizes a system different from the system 300 for maintaining a count of duplicate packets, in other embodiments.

The system 300 includes a sequence number analyzer 302 coupled to a next expected sequence number indicator 304.

The system 300 maintains the next expected sequence number indicator 304 such that the next expected sequence number indicator 304, at any given time, indicates a sequence number, within the sequence of packets being received by the network device, expected to next be received by the network device, in an embodiment. In operation, the sequence number analyzer 302 receives a sequence number 306 associated with a packet received by the network device, and determines whether the sequence number precedes the next sequence expected sequence number indicated by the indicator 304 or is greater than or equal to the next sequence expected sequence number indicated by the indicator 304, in an embodiment. If the sequence analyzer 302 determines that the sequence number 306 is greater than or equal to the next expected sequence number indicated by the indicator 304, this indicates to the sequence analyzer 302 that the packet associated with the sequence number 306 (i) is not an out-of order packet and (ii) is not a duplicate of at least one other packet previously received by the network device. In an embodiment, in response to determining that the sequence number 306 is greater than or equal to the next expected sequence number indicated by the indicator 304, the sequence number analyzer increments the next sequence number indicator 304 to indicate a new next expected sequence number now expected to be received by the network device, in an embodiment. Additionally, in response to determining that the sequence number 306 is greater than or equal to the next expected sequence number indicated by the indicator 304 the sequence number analyzer 304 updates the sequence number record 109 to indicate that the sequence number 306 has been received by the network device, in an embodiment. For example, in an embodiment in which the sequence number record 200 of FIG. 2 corresponds to the sequence number record 109, the sequence number analyzer 304 shifts the indicators 202 currently stored in the sequence number record 200 such that the indicator 202-1 corresponds to the newly received sequence number 306, and sets the indicator 202-1 (e.g., to a logic 1) to indicate that a packet associated with the sequence number 306 has been received by the network device, in an embodiment.

On the other hand, if the sequence analyzer 302 determines that the sequence number 306 is less than the next expected sequence number indicated by the indicator 304, this indicates to the sequence number analyzer 304 that the packet associated with the sequence number 306 (i) is an out-of order packet and (ii) may be a duplicate of at least one other packet previously received by the network device. In an embodiment, in response to determining that the sequence number 306 is less than the next expected sequence number indicated by the indicator 304, the sequence number analyzer 304 increments an out-of-order counter 310 to account for the out-of-order packet associated with the sequence number 306. Additionally, the in response to determining that the sequence number 306 is less than the next expected sequence number indicated by the indicator 304, the sequence number analyzer 304 provides the sequence number 306 to the duplicate packet determination unit 111, in an embodiment.

In an embodiment, the selector 112 of the duplicate packet determination unit 111 selects, based on the sequence number 306 provided to the duplicate packet determination unit 111, the selector unit 112 selects the deterministic packet determination unit 114 or the probabilistic duplicate packet determination unit 116 to determine whether the packet 108 is a duplicate packet received by the network device 100. In an embodiment, the selector 112 makes this selection based on the sequence number associated with the out-of-order packet 108. For example, in an embodiment, the selector 112 selects the deterministic duplicate packet determination unit 114 when the sequence number associated with the out-of-order packet 108 is within the range of sequence numbers for which the received sequence number record 109 is currently maintained in the sequence number record 109. On the other hand, the selector 112 selects the probabilistic duplicate packet determination unit 114 when the sequence number associated with the out-of-order packet 108 precedes the range of sequence numbers for which the received sequence number record 109 is currently maintained in the sequence number record 109, in an embodiment.

The deterministic duplicate packet determination unit 114 deterministically determines, based on the sequence number record 109, whether the packet associated with the sequence number 306 is a duplicate of at least one other packet previously received by the network device 100. In particular, in an embodiment, if an indicator corresponding to the sequence number 306 in the sequence number record 109 indicates that at least one other packet associated with the sequence number 306 has previously been received by the network device 100, then the deterministic duplicate packet determination unit 318 determines that the packet is a duplicate of the at least one other packet previously received by the network device 100. Further, in response to deterministically determining that the packet associated with the sequence number 306 is a duplicate of the at least one other packet previously received by the network device, the deterministic duplicate packet determination unit 318 increments the duplicate packet counter 318 to account for the duplicate packet associated with the sequence number 306, in an embodiment.

On the other hand, if the indicator corresponding to the sequence number 306 in sequence number record 109 indicates that a packet associated with the sequence number 306 has not previously been received by the network device, then the deterministic duplicate packet determination unit 318 determines that the packet is not a duplicate of at least one other packet previously received by the network device. Additionally, the deterministic duplicate packet determination unit 318 updates the corresponding indicator in the record 109 to indicate that at least one other packet associated with the sequence number 306 has now been received by the network device, in an embodiment.

In an embodiment, when the sequence number 306 precedes the range of sequence numbers for which the record is currently being maintained in the received sequence number record 109, the selector 112 selects the probabilistic duplicate packet determination unit 116 to determine whether the packet associated with the sequence number 306 is a duplicate of another packet previously received by the network device 100 during reception of the sequence 106. In an embodiment, the probabilistic duplicate packet determination unit 116 determines a probability p that the packet associated with the sequence number 108 is a duplicate packet based on historical record of duplicate packets received by the network device. For example, the probabilistic duplicate packet determination unit 116 determines the probability p as a ratio of the number of packets, within a sequence of packets received by the network device, that have been determined to be duplicate packets received by the network device to the total number of out-of-order packets within the sequence of packets received by the network device. In an embodiment, the probabilistic duplicate packet determination unit 116 determines the probability p as a ratio of the current value of the duplicate packet counter 120 to the current value of the out-of-order packet counter 310. The probabilistic duplicate packet determination unit 116 then probabilistically determines whether the packet associated with the sequence number 306 is a duplicate packet based on the probability p.

Figure 4:
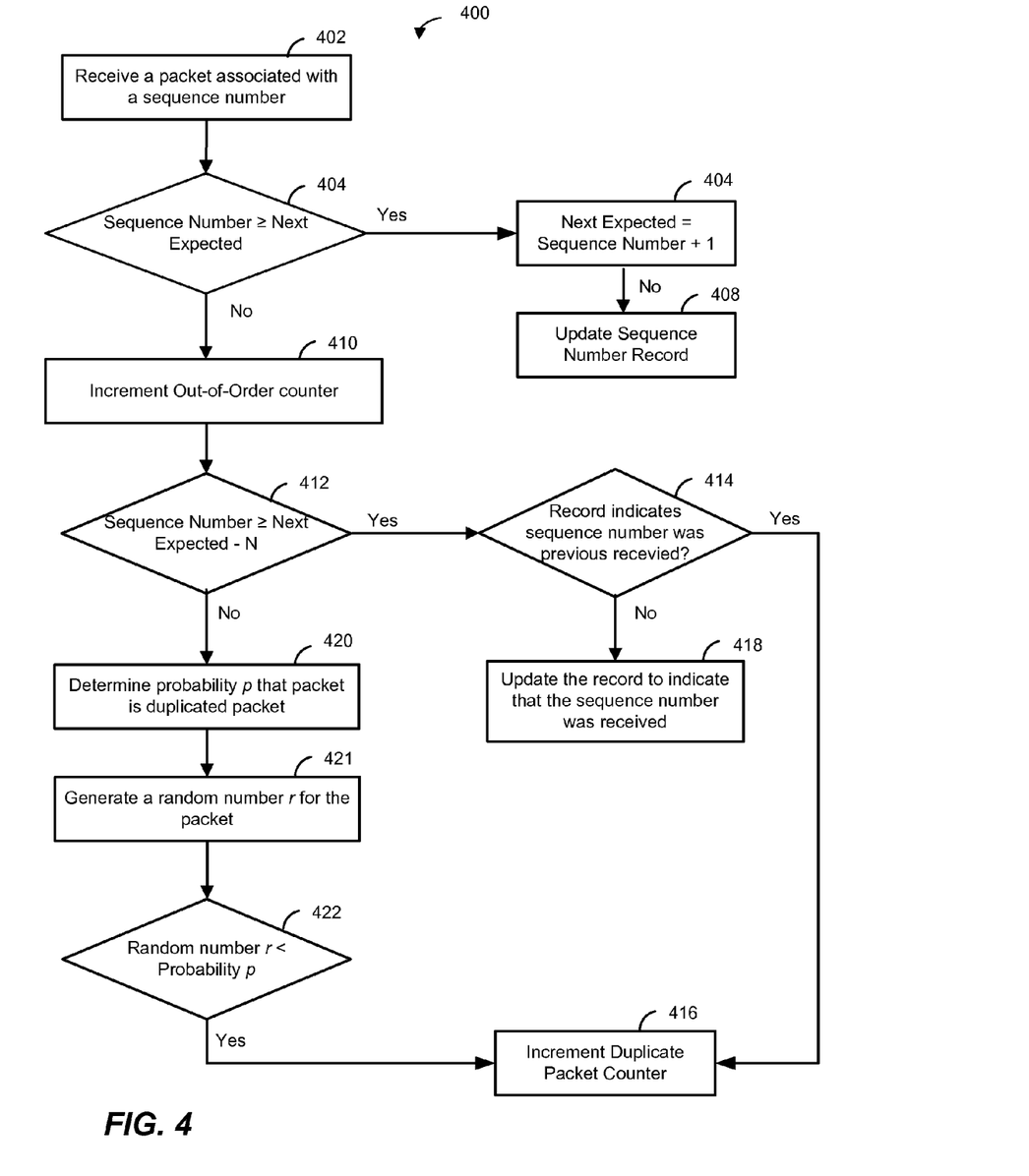
FIG. 4 is a flow diagram of an example method for determining whether a packet is a duplicate of at least one other packet previously received by the network device of FIG. 1, according to an embodiment.

FIG. 4 is a block diagram of a method 400 for maintaining a count of duplicate packets received by the network device, according to an embodiment. In an embodiment, the method 400 is implemented by the network device 100 of FIG. 1. In particular, in an embodiment the method 400 is implemented by the processor 102 of the network device 100 of FIG. 1. In an embodiment, the method 400 is implemented at least partially by a system such as the system 300 of FIG. 3 operating with the packet processor 102 of FIG. 1. In other embodiments, the method 400 is implemented in a network device different from the network device 100 of FIG. 1 and/or by a system different from the system 300 of FIG. 3. Similarly, the network device 100 of FIG. 1 and/or the system 300 of FIG. 3 implement a method other than the method 400 to maintain a count of duplicate packets, in other embodiments.

The method begins at block 402, at which a packet associated with a sequence number is received by a network device. In an embodiment, the packet received at block 402 is part of a sequence of packets transmitted to the network device, such as a sequence of OAM packets transmitted to the network device, for example for measuring a rate of duplication of packets in a network. In an embodiment, the sequence number associated with the packet received by the network device at block 401 is indicative of an order of transmission of the packet within the sequence of packets transmitted to the network device.

At block 404, it is determined whether a sequence number associated with a packet received by the network device is greater than or equal to the next expected sequence number that was expected to be received by the network device. If it is determined at block 402 that the sequence number is greater than or equal to the next expected sequence number that was expected to the received by the network device, this indicates that the packet (i) is not an out-of order packet within a sequence of packets transmitted to the network device and (ii) is not a duplicate of at least one other packet within the sequence of packets received by the network device. In this case, the method 400 proceeds to block 406, at which a next expected sequence number indicator is incremented. Also, at block 408, a record of sequence numbers is updated to indicate that a packet associated with the sequence number has now been received by the network device.

On the other hand, if it is determined at block 404 that the sequence number is less than the next expected sequence number that was expected to be received by the network device, this indicates that the packet is (i) an out-of order packet within the sequence of packets transmitted to the network device and (ii) may also be a duplicate of at least one other packet within the sequence of packets transmitted to the network device. In this case, the method 400 proceeds to block 410, at which an "out of order" counter is incremented to account for the out of order packet received by the network device. Also, at block 412, it is determined whether the sequence number associated with the packet received at block 402 is within a range of sequence numbers for which a received sequence number record is maintained by the network device. For example, in an embodiment in which the network device maintains a record of received sequence numbers within a sliding window of N sequence numbers that immediately precedes the next expected sequence number, it is determined at block 410 whether the sequence number associated with the packet received at block 402 is greater than or equal to the sequence number that precedes the next expected sequence number by N (next expected sequence number -N).

If it is determined at block 412 that the sequence number associated with the packet received at block 402 is within the range of sequence numbers for which a record of received sequence numbers is maintained by the network device, the method 400 proceeds to block 414, at which it is deterministically determined based on the record whether the packet received at block 402 is a duplicate of at least one other packet, within the sequence of packets, previously received by the network device. In particular, in an embodiment, the sequence number associated with the packet received at block 402 is compared against the record (e.g., against a corresponding indicator in the record). If the record indicates that at least one other packet associated with the same sequence number has previously been received by the network device, this indicates that the packet is a duplicate of the at least one packet previously received by the network device. In this case, a duplicate packet counter is incremented at block 416 to account for the duplicate packet received at block 402.

On the other hand, if the record indicates that a packet associated with the same sequence number has not been previously received by the network device, this indicates that the packet is not a duplicate of at least one other packet previously received by the network device. In this case, the method proceeds to block 418, at which the record is updated to indicate that a packet associated with the sequence number has now been received by the network device.

Returning to block 412, a determination that the sequence number associated with the packet received at block 402 precedes the range of sequence numbers for which a record of received sequence numbers is maintained by the network device (e.g., when it is determined that the sequence number is less than the next expected sequence number -N), the method proceeds to block 420. At block 420, a probability p that the packet received at block 402 is a duplicate of at least one other packet previously received by the network device based on statistics of reception of duplicate packets by the network device. In an embodiment, the probability p is determined at block 418 as a ratio of the number of packets, within the sequence of packets received by the network device, that have been determined to be duplicates of packets previously received by the network device to the total number of out-of-order packets within the sequence of packets received by the network device. For example, the probability p at bock 420 is determined as a ratio of the value of the duplicate packet counter maintained by the network device to the value of the out-of-order counter maintained by the network device, in an embodiment. In an embodiment, the out-of-order packet counter and the duplicate packet counter are maintained for a range of sequence numbers that is greater than the range of sequence numbers for which a record of received sequence numbers is maintained by the network device. As a result, in an embodiment, the probability p at block 420 is determined based on data collected on a set of sequence numbers that is greater than the set of sequence numbers for which the record of received sequence numbers is maintained by the network device.

At block 421, a random number r is generated for the packet. In an embodiment, the random number generated at block 421 is a random number in the range of zero to one (0 to 1), At block 422, the random number r generated at block 421 is compared with the probability p determined at block 420. If the comparison at block 422 indicates that the random number r is greater than (or, alternatively that the random number r is greater than or equal to) the probability p, then the method 400 proceeds to block 424 at which it is probabilistically determined that the packet received at block 402 is a duplicate of at least one other packet previously received by the network device. The method then proceeds to block 416 at which the duplicate packet counter is incremented to account for the packet received at block 402 based on the probabilistic determination made at block 424.

On the other hand, if the comparison at block 422 indicates that the random number r is less than (or, alternatively that the random number r is less than or equal to) the probability p, then the method 400 proceeds to block 426 at a probabilistic determination is made that the packet received at block 402 is not a duplicate of at least one other packet previously received by the network device, in an embodiment.

Figure 5:
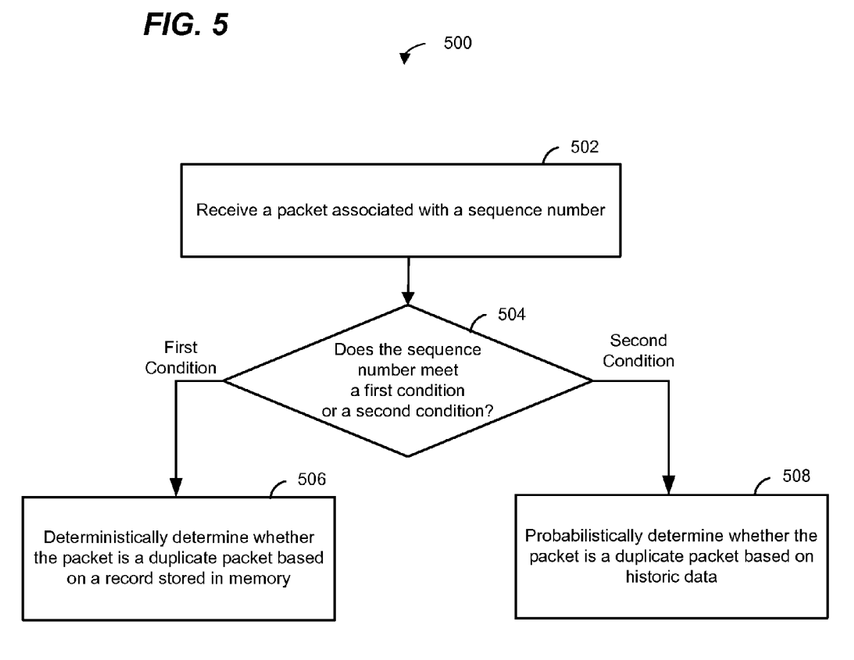
FIG. 5 is a flow diagram of an example method for maintaining a count of duplicate packets, according to an embodiment.

FIG. 5 is a flow diagram of an example method 500 for maintaining a count of duplicate packets, according to an embodiment. In an embodiment, is implemented by the network device 100 of FIG. 1. In another embodiment, the method 500 is implemented in a network device different that the network device 100 of FIG. 1.

At block 502, a packet associated with a sequence number is received by the network device. In an embodiment, the sequence number is indicative of an order of transmission of the packet within a sequence of packets transmitted to the network device.

At block 504, it is determined whether the sequence number associated with the packet received at block 502 meets a first condition or a second condition for determining whether the packet is a duplicate packet received by the network device. For example, in an embodiment, it is determined at block 504 that the sequence number meets the first condition if the sequence number is within a range of sequence numbers for which a record of received sequence numbers is maintained by the network device. On the other hand, in this embodiment, it is determined at block 504 that the sequence number meets the second condition if the sequence number precedes the range of sequence numbers for which a record of received sequence numbers is maintained by the network device.

When it is determined at block 504 that the sequence number meets the first condition, the method proceeds to block 506. At block 506, it is deterministically determined whether the packet is a duplicate packet based on the record received sequence numbers is maintained by the network device. On the other hand, when it is determined at block 504 that the sequence number meets the first condition, the method proceeds to block 508. At block 508, it is probabilistically determined whether the packet is a duplicate packet based on historical data maintained by the network device. For example, in an embodiment, it is probabilistically determined at block 508 whether the packet is a duplicate packet based on a ratio of number of received packets, within the sequence of packets, that were historically determined to be duplicate packets and a total number packets, within the sequence of packets, received out-of-order by the network device.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method, comprising:
receiving a packet at a network device, the packet associated with a sequence number indicative of an order of transmission of the packet within a sequence of packets received by the network device;
determining whether the sequence number associated with the packet meets a first condition or a second condition for determining whether the packet is a duplicate of at least one other packet previously received by the network device; and
in response to determining that the sequence number meets the first condition, deterministically determining whether the packet is a duplicate of at least one other packet based on a record of previously received sequence numbers, the record stored in a memory of the network device, and
in response to determining that the sequence number meets the second condition, probabilistically determining whether the packet is a duplicate of at least one other packet based on historical data maintained by the network device.

2. The method of claim 1, further comprising, in response to determining that the packet is a duplicate of at least one other packet, incrementing a packet duplication counter to account for the packet.

3. The method of claim 1, wherein the record stored in the memory comprises a set of indicators corresponding to a subset of packets, within the sequence of packets, received by the network device, wherein a particular indicator is indicative of whether at least one packet associated with a corresponding sequence number was previously received by the network device.

4. The method of claim 3, wherein the particular indicator of the set of indicators comprises one bit, wherein a first value of the one bit indicates that the corresponding sequence number has previously been received by the network device and a second value of the one bit indicates that the corresponding sequence number has not been previously received by the network device.

5. The method of claim 3, wherein the set of indicators corresponding to the subset of packets within the sequence of packets received by the network device includes respective indicators corresponding to sequence numbers within a sliding window of sequence numbers, wherein the sliding window of sequence numbers includes a plurality of sequential sequence numbers that immediately precede a next expected sequence number expected to be received by the network device.

6. The method of claim 5, wherein determining whether the sequence number associated with the packet meets the first condition or the second condition comprises determining whether the sequence number associated with the packet (a) is within the sliding window of sequence numbers or (b) precedes the sliding window of sequence numbers.

7. The method of claim 5, wherein determining whether the packet is a duplicate of at least one other packet based on the record stored in the memory of the network device comprises (i) determining that the packet is a duplicate of at least one other packet when the indication corresponding to the sequence number indicates that at least one other packet associated with the sequence number was previously received by the network device or (ii) determining that the packet is not a duplicate of at least one other packet previously received by the network device when the indication corresponding to the sequence number associated with the packet indicates that no other packet associated with the sequence number was previously received by the network device.

8. The method of claim 5, wherein probabilistically determining whether the packet is a duplicate of at least one other packet based on historical data maintained by the network device comprises probabilistically determining whether the packet is a duplicate based on historical data maintained for a set of sequence numbers that is larger than the subset of sequence numbers for which the record is stored in the memory.

9. The method of claim 8, further comprising
maintaining a first counter to count a number of packets, within the sequence of packets, that were received with a sequence number that precedes a next expected sequence number expected to be received by the network device,
maintaining a second counter to count a number of packet, of the packets that were received with a sequence number that precedes a next expected sequence number expected to be received by the network device, that were determined to be duplicates of other packets received by the network device, and
determining a probability that the packet is a duplicate, including determining the probability as a ratio of a value of the second counter to a value of the first counter.

10. The method of claim 9, further comprising
generating a random number for the packet,
comparing the random number generated for the packet to the determined probability, and
determining that the packet is a duplicate if the random number exceeds the probability.

11. A network device, comprising:
an ingress interface configured to receive packets from a network, wherein the packets are associated with respective sequence numbers indicative of an order of transmission of the packets to the network device;
a memory configured to store a record of sequence numbers that have been received by the network device; and
a packet processor configured to
determine whether the sequence number associated with the packet meets a first condition or a second condition for determining whether the packet is a duplicate of at least one other packet previously received by the network device, and
in response to determining that the sequence number meets the first condition, deterministically determine whether the packet is a duplicate of at least one other packet based on information stored in the memory of the network device, and
in response to determining that the sequence number meets the second condition, probabilistically determine whether the packet is a duplicate of at least one other packet based on historical data maintained by the network device.

12. The network device of claim 11, wherein the processor is configured to, in response to determining that the packet is a duplicate of at least one other packet, increment a packet duplication counter to account for the packet.

13. The network device of claim 11, wherein the record stored in the memory comprises a set of indicators corresponding to a subset of packets, within the sequence of packets, received by the network device, wherein a particular indicator is indicative of whether at least one packet associated with a corresponding sequence number was previously received by the network device.

14. The network device of claim 13, wherein the particular indicator of the set of indicators comprises one bit, wherein a first value of the one bit indicates that the corresponding sequence number has previously been received by the network device and a second value of the one bit indicates that the corresponding sequence number has not been previously received by the network device.

15. The network device of claim 13, wherein the set of indicators corresponding to the subset of packets within the sequence of packets received by the network device includes respective indicators corresponding to sequence numbers within a sliding window of sequence numbers, wherein the sliding window of sequence numbers includes a plurality of sequential sequence numbers that immediately precede a next expected sequence number expected to be received by the network device.

16. The network device of claim 15, wherein the processor is configured to determine whether the sequence number associated with the packet meets the first condition or the second condition at least by determining whether the sequence number associated with the packet (a) is within the sliding window of sequence numbers or (b) precedes the sliding window of sequence numbers.

17. The network device of claim 15, wherein the processor is configured to determine whether the packet is a duplicate of at least one other packet based on the record stored in the memory at least by (i) determining that the packet is a duplicate of at least one other packet when the indication corresponding to the sequence number indicates that at least one other packet associated with the sequence number was previously received by the network device or (ii) determining that the packet is not a duplicate of at least one other packet previously received by the network device when the indication corresponding to the sequence number associated with the packet indicates that no other packet associated with the sequence number was previously received by the network device.

18. The network device of claim 15, wherein the processor is configured to probabilistically determining whether the packet is a duplicate of at least one other packet based on historical data maintained by the network device at least by probabilistically determining whether the packet is a duplicate based on historical data maintained for a set of sequence numbers that is larger than the subset of sequence numbers for which the record is stored in the memory.

19. The network device of claim 18, wherein the processor is further configured to
 maintain a first counter to count a number of packets, within the sequence of packets, that were received with a sequence number that precedes a next expected sequence number expected to be received by the network device,
 maintain a second counter to count a number of packet, of the packets that were received with a sequence number that precedes a next expected sequence number expected to be received by the network device, that were determined to be duplicates of other packets received by the network device, and
 determine a probability that the packet is a duplicate, including determining the probability as a ratio of a value of the second counter to a value of the first counter.

20. The network device of claim 19, wherein the processor is configured to
 generate a random number for the packet,
 compare the random number generated for the packet to the determined probability, and
 determine that the packet is a duplicate if the random number exceeds the probability.

* * * * *